(12) United States Patent
Marsh

(10) Patent No.: US 7,677,655 B2
(45) Date of Patent: Mar. 16, 2010

(54) COMBINATION SEAT AND STORAGE ENCLOSURE METHOD AND APPARATUS

(76) Inventor: William Charles Marsh, 4650 Caterpillar Rd., Redding, CA (US) 96003

( * ) Notice: Subject to any disclaimer, the term of this patent is extended or adjusted under 35 U.S.C. 154(b) by 829 days.

(21) Appl. No.: 11/316,484

(22) Filed: Dec. 21, 2005

(65) Prior Publication Data
US 2007/0138852 A1    Jun. 21, 2007

Related U.S. Application Data

(60) Provisional application No. 60/637,589, filed on Dec. 20, 2004.

(51) Int. Cl.
*A47C 13/00* (2006.01)
(52) U.S. Cl. .................... 297/129; 297/188.1; 296/37.5; 296/67; 296/69

(58) Field of Classification Search ................. 297/129, 297/188.02, 188.1, 69, 67, 37.1, 37.5
See application file for complete search history.

(56) References Cited

U.S. PATENT DOCUMENTS 4,106,809 A * 8/1978 Minka .......................... 296/69

FOREIGN PATENT DOCUMENTS

JP        60199743 A    * 10/1985
JP        03045434 A    *  2/1991

* cited by examiner

*Primary Examiner*—Anthony D Barfield

(57) ABSTRACT

A seat having a back portion and a bottom portion can be inverted to form a storage enclosure, wherein the back portion forms the top of the enclosure and the bottom portion forms a side of the enclosure. Movable end panels may also be provided to secure the ends of the enclosure.

14 Claims, 13 Drawing Sheets

US 7,677,655 B2

COMBINATION SEAT AND STORAGE ENCLOSURE METHOD AND APPARATUS

RELATED APPLICATIONS

This application claims the benefit of U.S. provisional application Ser. No. 60/637,583, filed Dec. 20, 2004 by William Charles Marsh, incorporated herein by reference in its entirety.

BACKGROUND OF THE INVENTION

The invention relates generally to seats that can be converted to storage enclosures.

Vehicle storage requirements and the seating of vehicle occupants often compete for the same space within a vehicle. To balance both of these requirements, that often vary, vehicles often are equipped with areas that can alternately be used for seating or storage. Typical examples include seats that fold down, fold up, move laterally or can be removed from the vehicle. Removing a seat from a vehicle can be cumbersome. Once removed from the vehicle, a seat takes up space outside the vehicle. Furthermore, once a seat is removed at a particular location, it will not be available when it may be needed at a different location.

Storing items in a convertible often presents additional challenges, such as protecting the stored items from weather and theft.

What is needed and not provided by the prior art is an apparatus that can be converted from a seat to an enclosed storage area.

SUMMARY OF THE INVENTION

According to aspects of certain embodiments of the present invention, an apparatus is disclosed having a first portion, a second portion movably connected with the first portion; and an articulation means for moving the first and second portions between a first position and a second position, wherein the first portion serves as a seat back and the second portion serves as seat bottom when both are in the first position, and the first portion serves as a storage container top and the second portion serves as a storage container side when both are in the second position.

According to other aspects of certain embodiments of the present invention, a vehicle seat is disclosed having a base attachable to a vehicle, a seat back panel hingedly coupled to the base; and a seat bottom panel hingedly coupled to the lower edge of the seat back panel, wherein the seat back panel is movable from a generally vertical position to a generally horizontal position, and the seat bottom panel is movable from a generally horizontal position to a generally vertical position to form at least part of a generally enclosed storage area on the vehicle.

According to still other aspects of certain embodiments of the present invention, a method of increasing vehicle storage space is disclosed. The method includes inverting a generally concave vehicle seat structure formed by a plurality of coupled seat members to form a generally convex vehicle storage structure.

DESCRIPTION OF THE SPECIFIC EMBODIMENTS

According to aspects of the present invention, methods and apparatuses are disclosed for alternately providing seating or storage space.

Figure 1:
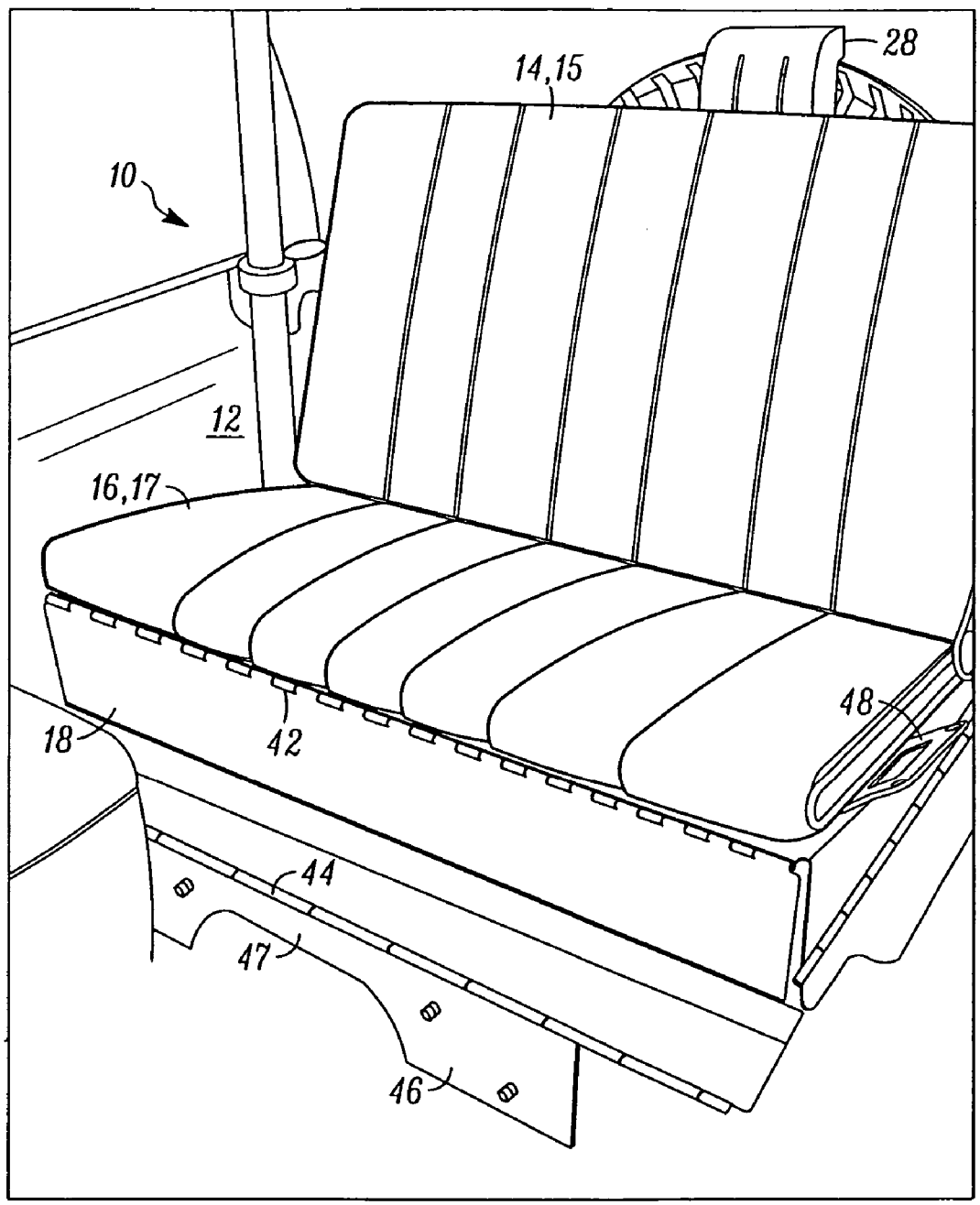
FIG. 1 is a front perspective view of a seat constructed according to aspects of the present invention, shown mounted in a vehicle and in a seat configuration.

Referring to FIG. 1, a convertible seat 10 constructed according to certain aspects of the present invention is shown located in the rearward area of a convertible vehicle 12 (a model CJ5 Jeep). Seat 10 includes a cushioned seat back panel 14, a cushioned seat bottom panel 16 and a articulating member 18. In the configuration shown in FIG. 1, generally concave or L-shaped seat 10 may be used to seat one or more occupants.

Figure 2:
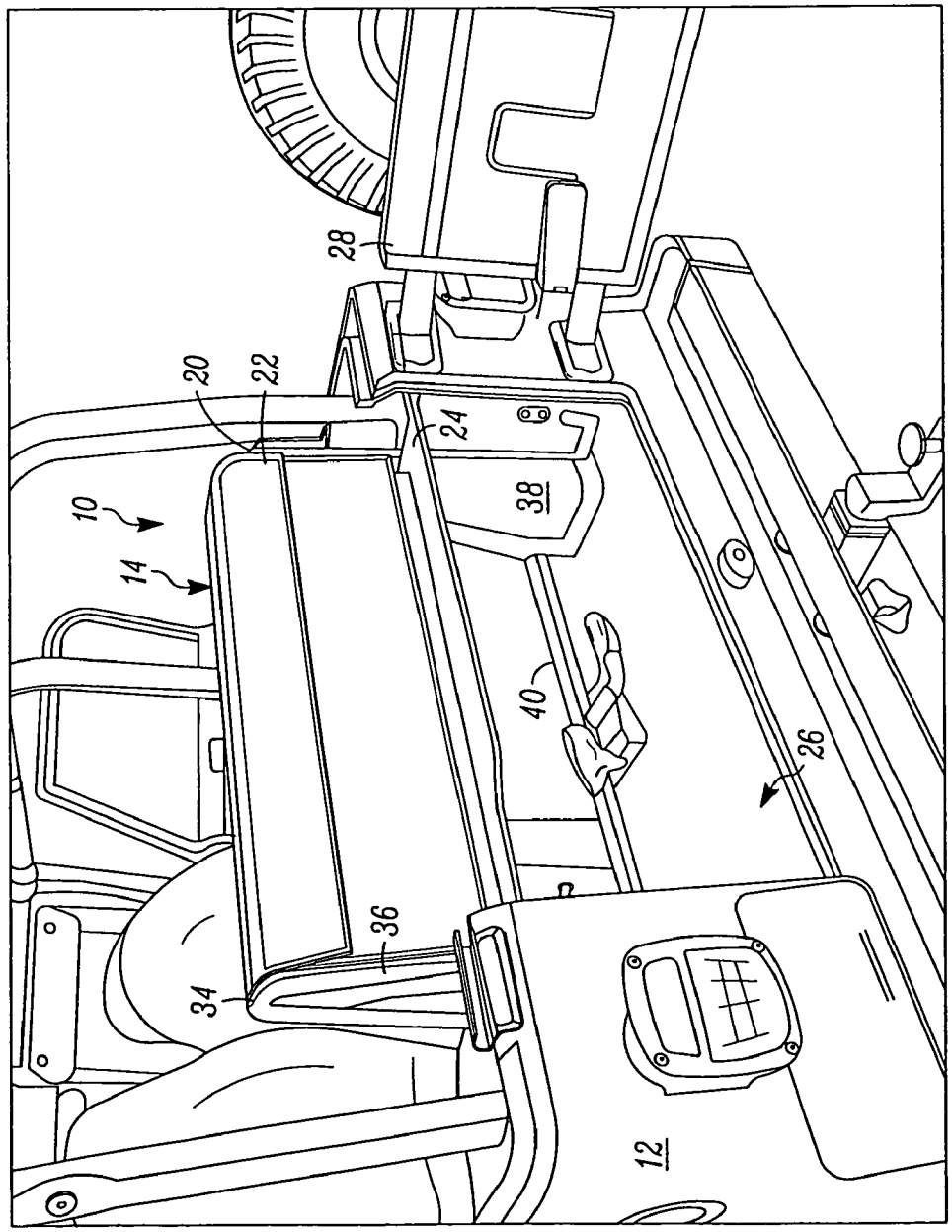
FIG. 2 is a rear perspective view of the seat shown in FIG. 1.

Referring to FIG. 2, a rear view of seat 10 in vehicle 12 is shown in the same configuration shown in FIG. 1. Seat 10 includes rear panel 20 which has an upright portion 22, and a generally horizontal portion 24 which projects rearwardly from upright portion 22. A small storage compartment 26 is formed below horizontal portion 24 which can be completely enclosed when tailgate 28 of vehicle 12 is closed.

Figure 3:
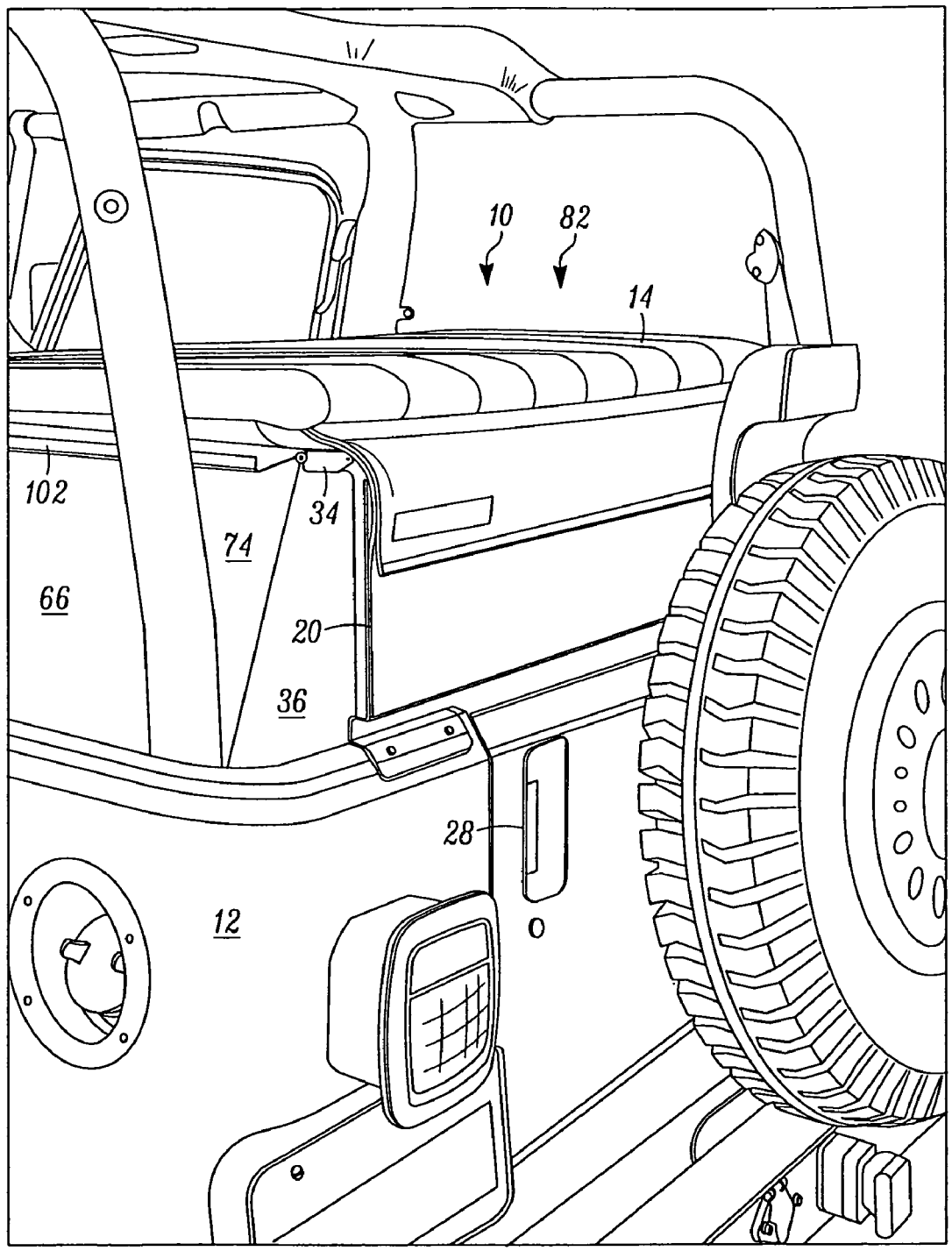
FIG. 3 is a rear perspective view similar to FIG. 2, but with the inventive seat in a storage enclosure configuration and the vehicle tailgate in a closed position.

Referring to FIG. 3, seat 10 can be converted into a large storage trunk configuration as shown. In this configuration, seat back panel 14 is raised to a generally horizontal position, while seat bottom panel 16 is raised to a generally vertical position (shown in FIG. 4), as described in detail below. In this configuration, seat 10 is rectangular box-shaped.

Figure 4:
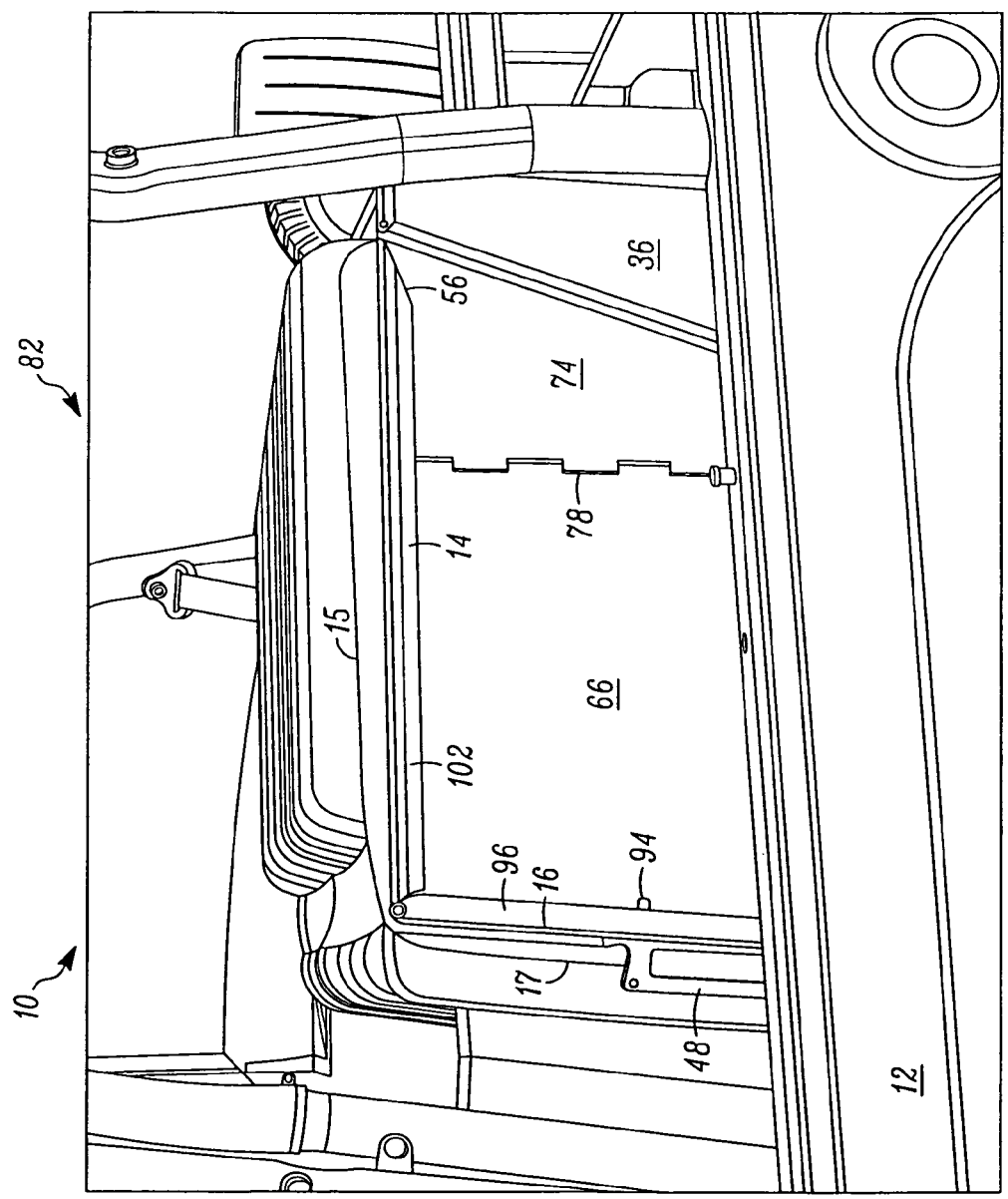
FIG. 4 is a side perspective view showing the seat configuration illustrated in FIG. 3.

Referring to FIG. 4, a side view of vehicle 12 shows seat 10 in the large storage trunk configuration. Seat back pad 15 is shown attached to seat back panel 14, and seat bottom pad 17 is shown attached to seat bottom panel 16. As can be seen, the relative orientation of seat back panel 14 to seat bottom panel 16 has been inverted, now forming a convex, inverted L shape.

Figure 5:
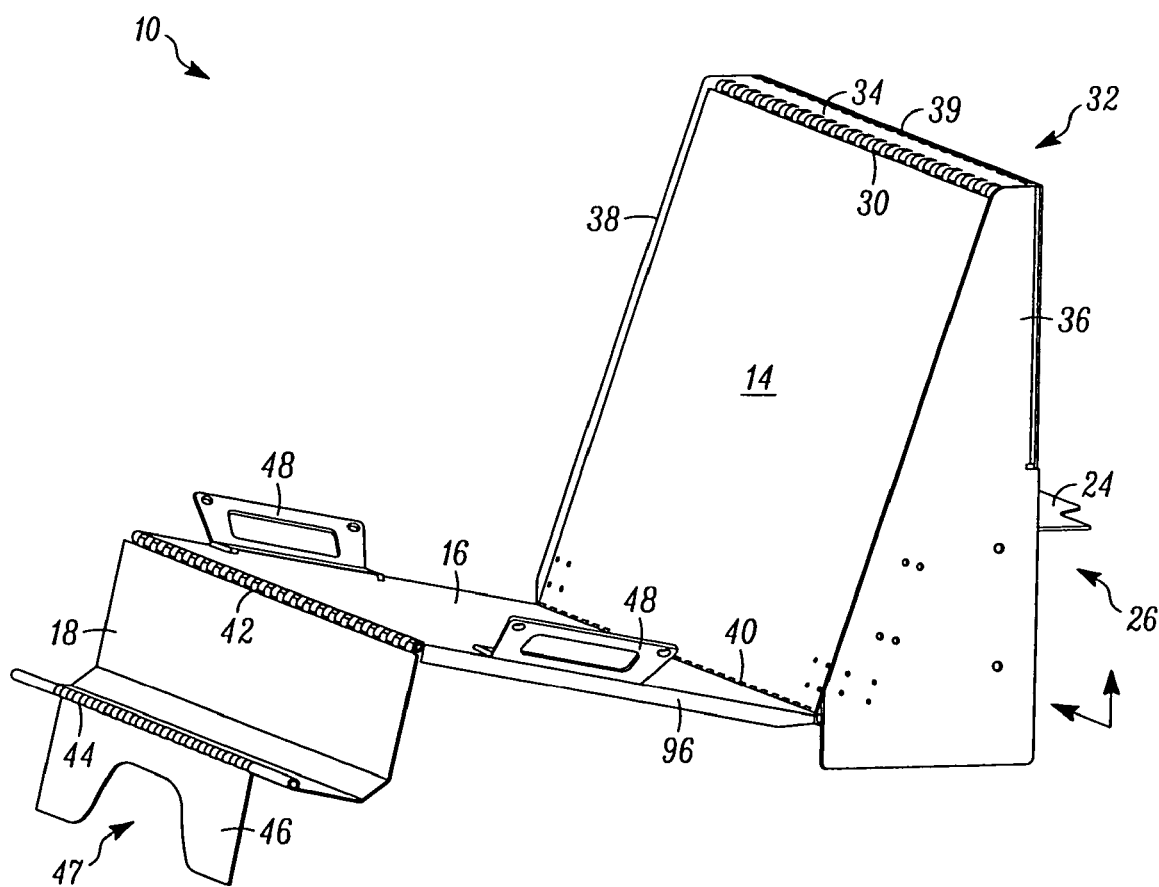
FIG. 5 is a front perspective view showing a seat similar to the one shown in FIG. 1, with the vehicle, seat padding and other elements omitted.

Referring to FIG. 5, seat 10 is shown without cushioned panels for clarity. Seat 10 can be used with or without cushions. According to aspects of the present invention, seat back panel 14 has an upper edge connected by hinge 30 to a stationary base 32. In this embodiment, base 32 includes top plate 34, left upright 36, and right upright 38. Uprights 36 and 38 are attached to vehicle 12 as will be more fully described later. In addition to supporting seat back panel 14, top plate 34 supports movable rear panel 20 through hinge 39. Seat back panel 14 has a lower edge connected by hinge 40 to an aft edge of seat bottom panel 16. Seat bottom panel 16 in turn has a forward edge connected by hinge 42 to an upper edge of articulating member 18. Articulating member 18 has a lower edge, connected by hinge 44 to anchor member 46. Anchor member 46 has a cutout 47 to accommodate a transmission/ driveshaft tunnel formed in the floor of the vehicle 12. Anchor member 46 is attached to vehicle 12 as will be more fully described later. Handles 48 can be provided on the sides of seat bottom panel 16 for use by seated occupants and or to aid in converting seat 10 between a seat and a storage enclosure.

Figure 6:
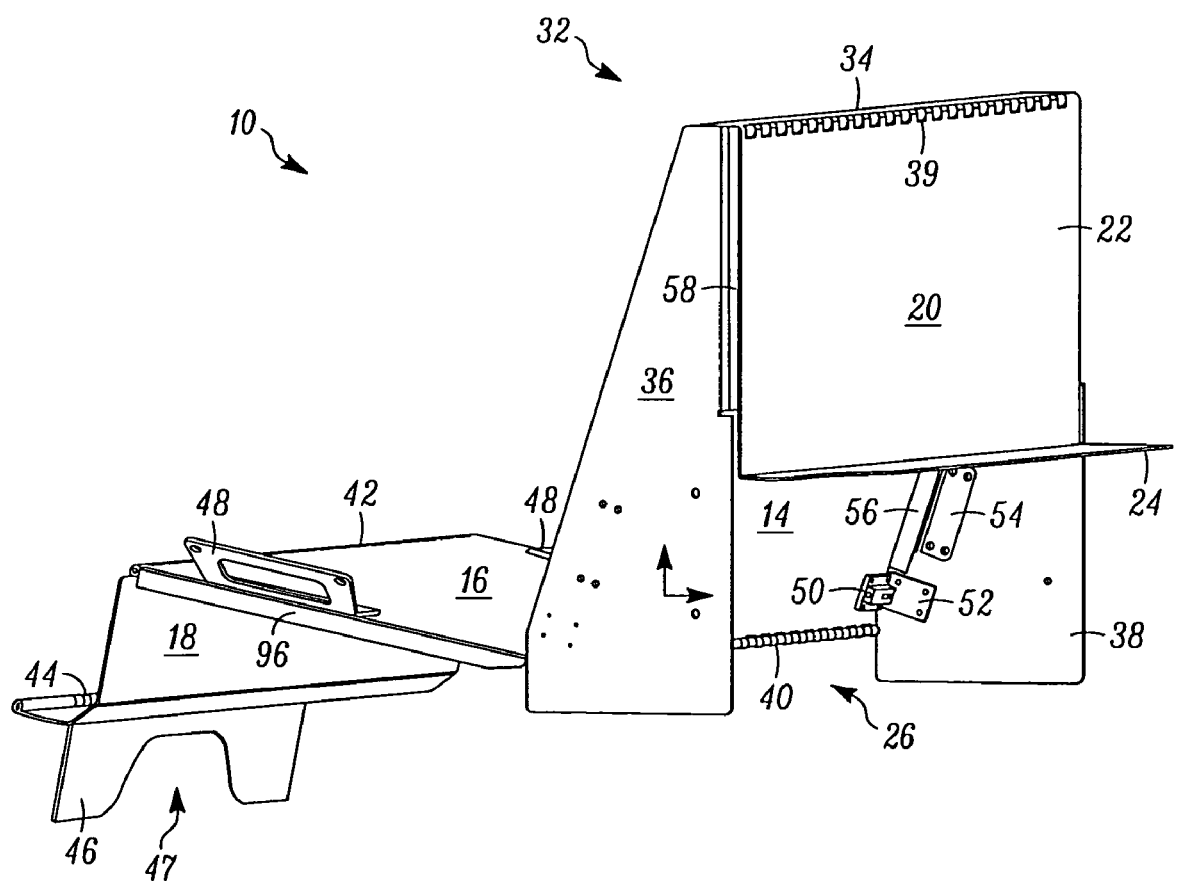
FIG. 6 is a rear perspective view of the seat shown in FIG. 5.

Referring to FIG. 6, a left rear view of seat 10 is shown. A lock 50 can be provided on each side of the back of seat back panel 14 for engagement with a strike plate 52 to releasably secure seat back 14 to uprights 36 and 38, when seat 10 is in the seat configuration as shown. A seat stop 54 can also be located on each upright 36 and 38 to a abut against side flanges 56 of seat back 14, thereby limiting the range of a rearward motion of seat back 14. Flange 58 of upright 36 and flange 60 of upright 38 (not seen in FIG. 6) can be provided to prevent the inward travel of rear panel 20.

Figure 7:
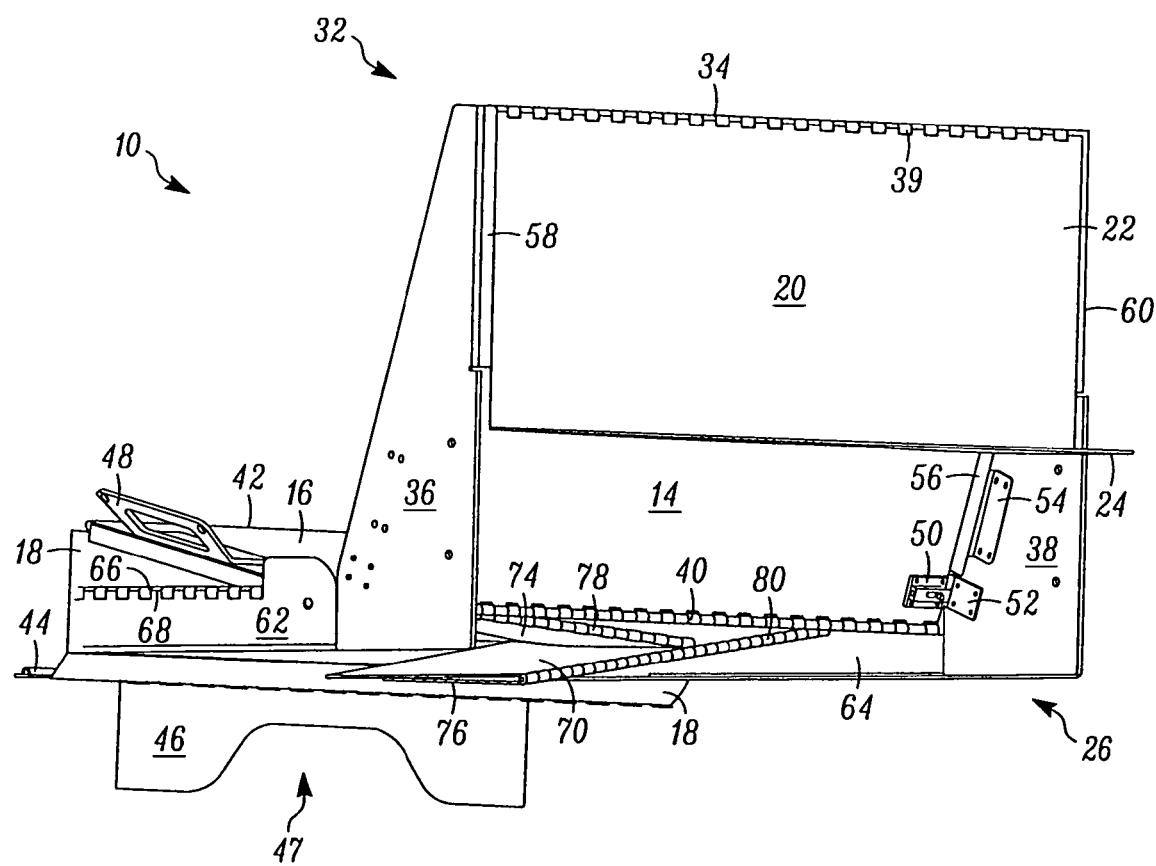
FIG. 7 is a lower rear perspective view of the seat shown in FIG. 5, showing additional components according to aspects of the present invention.

Referring now to FIG. 7, a lower rear view of seat 10 shows additional components. Left end mount 62 and right end mount 64, can be attached to vehicle 12 as will be further described later. Left end plate 66 is attached to left end mount 62 by hinge 68. Similarly, right end plate 70 is attached to right end mount 64 by hinge 72. In the seat configuration of this embodiment, end plates 66 and 70 reside below seat bottom panel 16 as shown.

Figure 8:
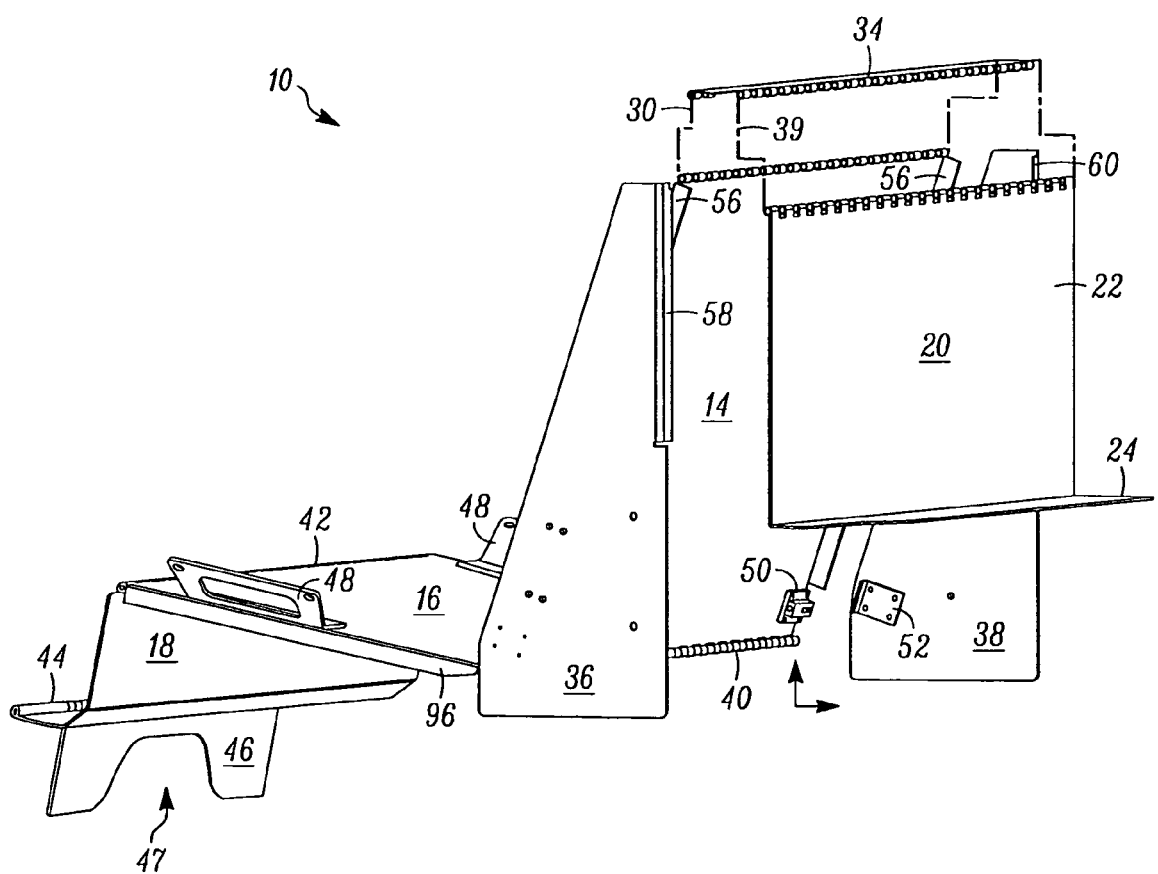
FIG. 8 is a partially exploded rear perspective view of the seat shown in FIG. 5.

Referring to FIG. 8, a partially exploded view of seat 10 is shown with some components omitted for clarity.

Figure 9:
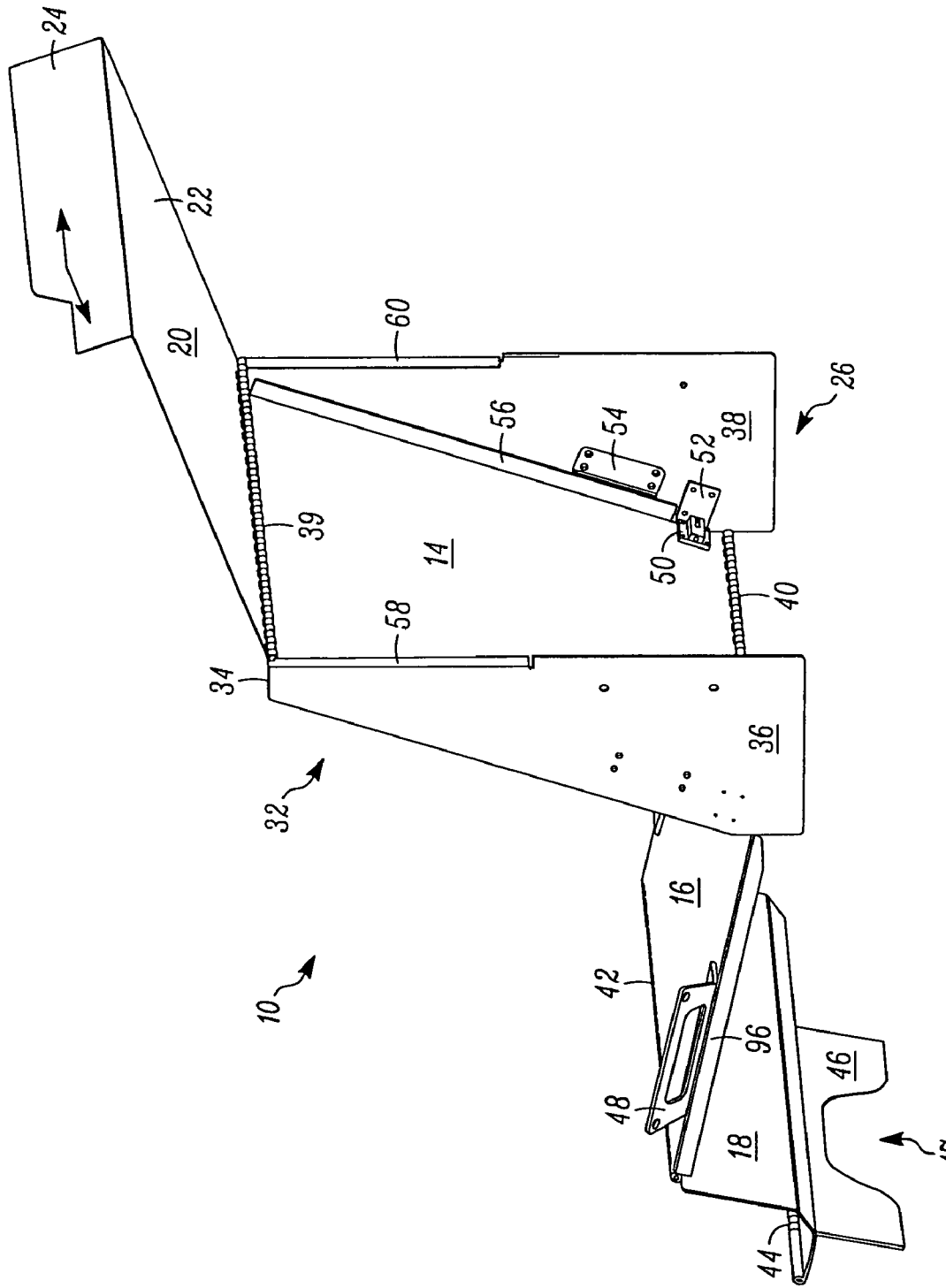
FIG. 9 is a rear perspective view of the seat shown in FIG. 5 with rear panel 20 raised.

Referring to FIG. 9, seat 10 is shown again in the seat configuration, and with rear panel 20 raised to expose small storage compartment 26 of seat 10.

Figure 10:
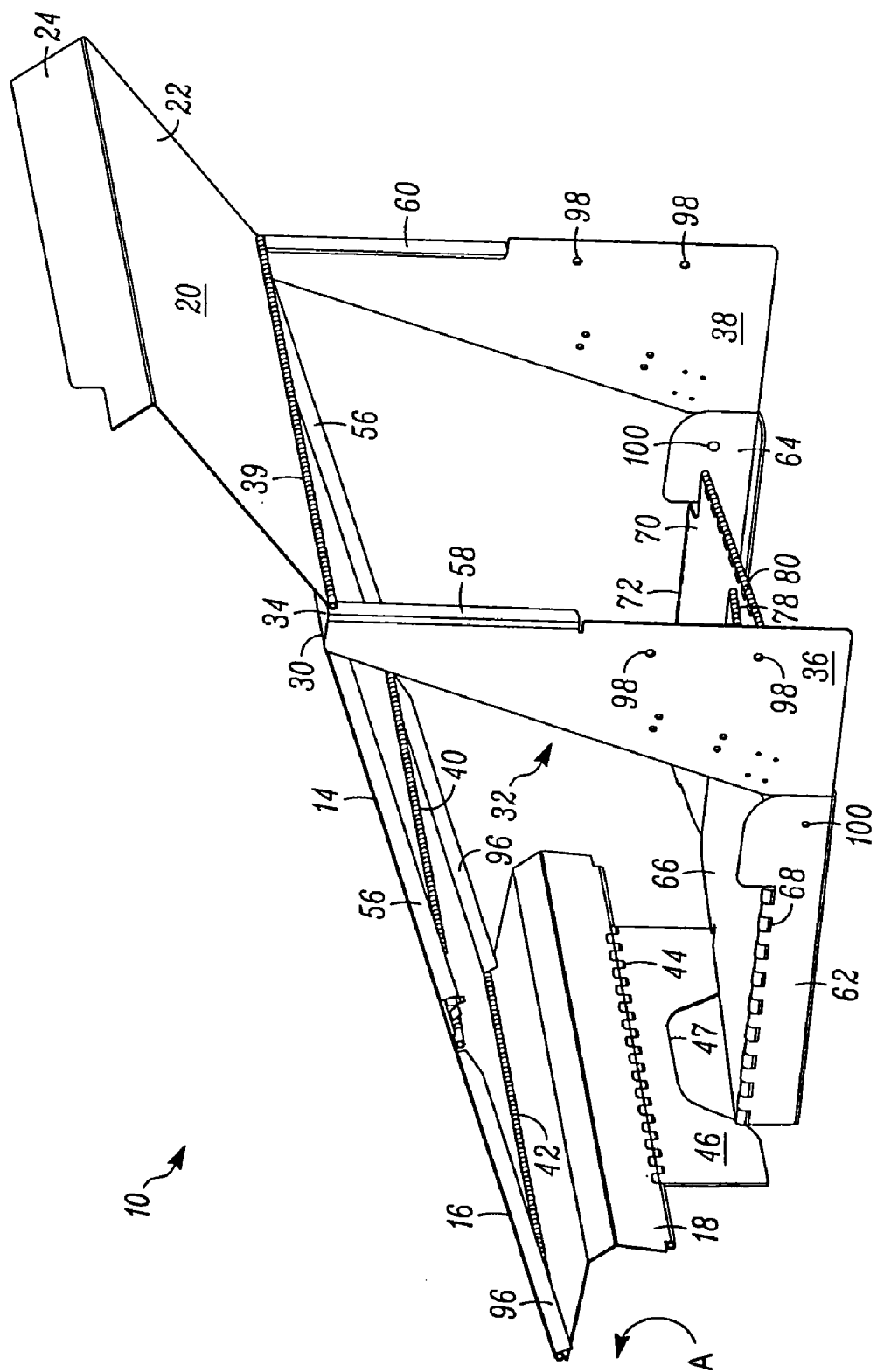
FIG. 10 is a rear perspective view of the seat shown in FIG. 9, showing the additional components of FIG. 7, and showing the seat partway between the seat and storage configurations.
Figure 11:
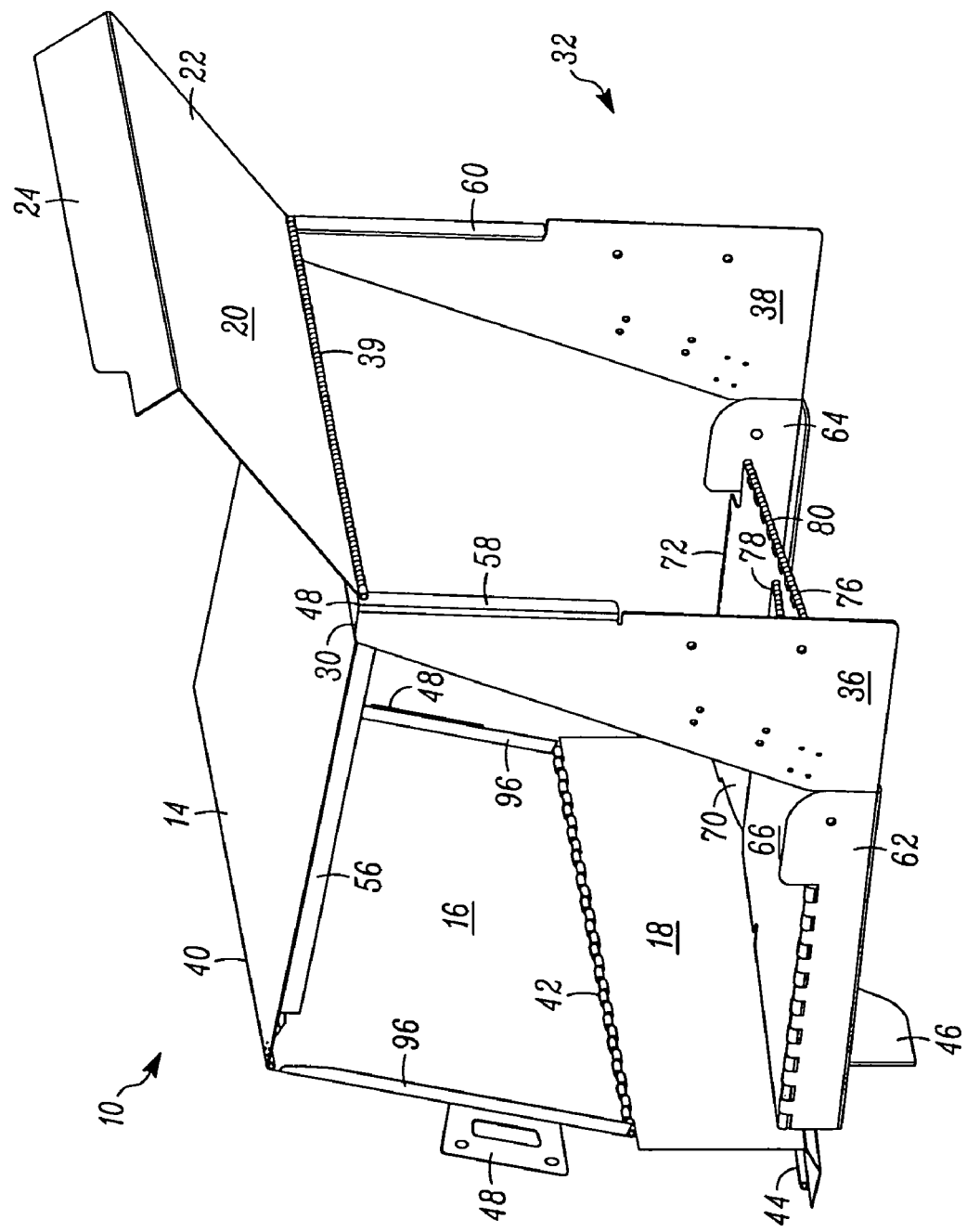
FIG. 11 is a rear perspective view of the seat shown in FIG. 10, showing the seat converted further towards the storage configuration.

Referring to FIGS. 10 and 11, initiating a method of converting seat 10 from a seat to a large storage compartment will be described. In this exemplary embodiment, the conversion process begins by raising rear panel 20 and disengaging locks 50 from strike plates 52. Seat back panel 14 and seat bottom panel 16 are then raised through the position shown in FIG. 10 to the storage configuration position shown in FIG. 11. Note that articulating member 18 temporarily tips forward in the direction of arrow A shown in FIG. 10 to permit panels 16 and 18 to travel between the seat and storage compartment configurations.

Figure 12:
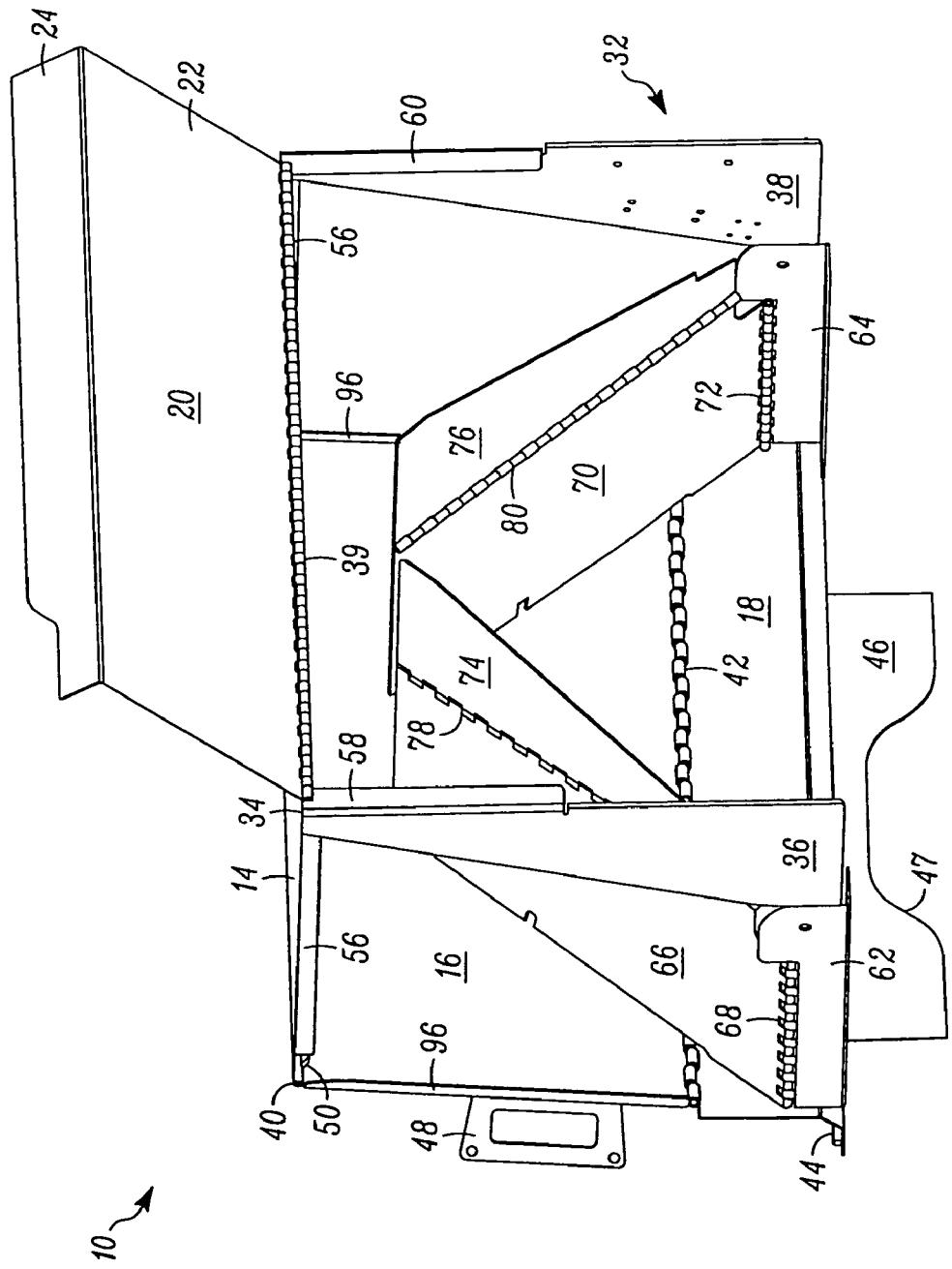
FIG. 12 is a rear perspective view of the seat shown in FIG. 11, showing the seat converted further towards the storage configuration.
Figure 13:
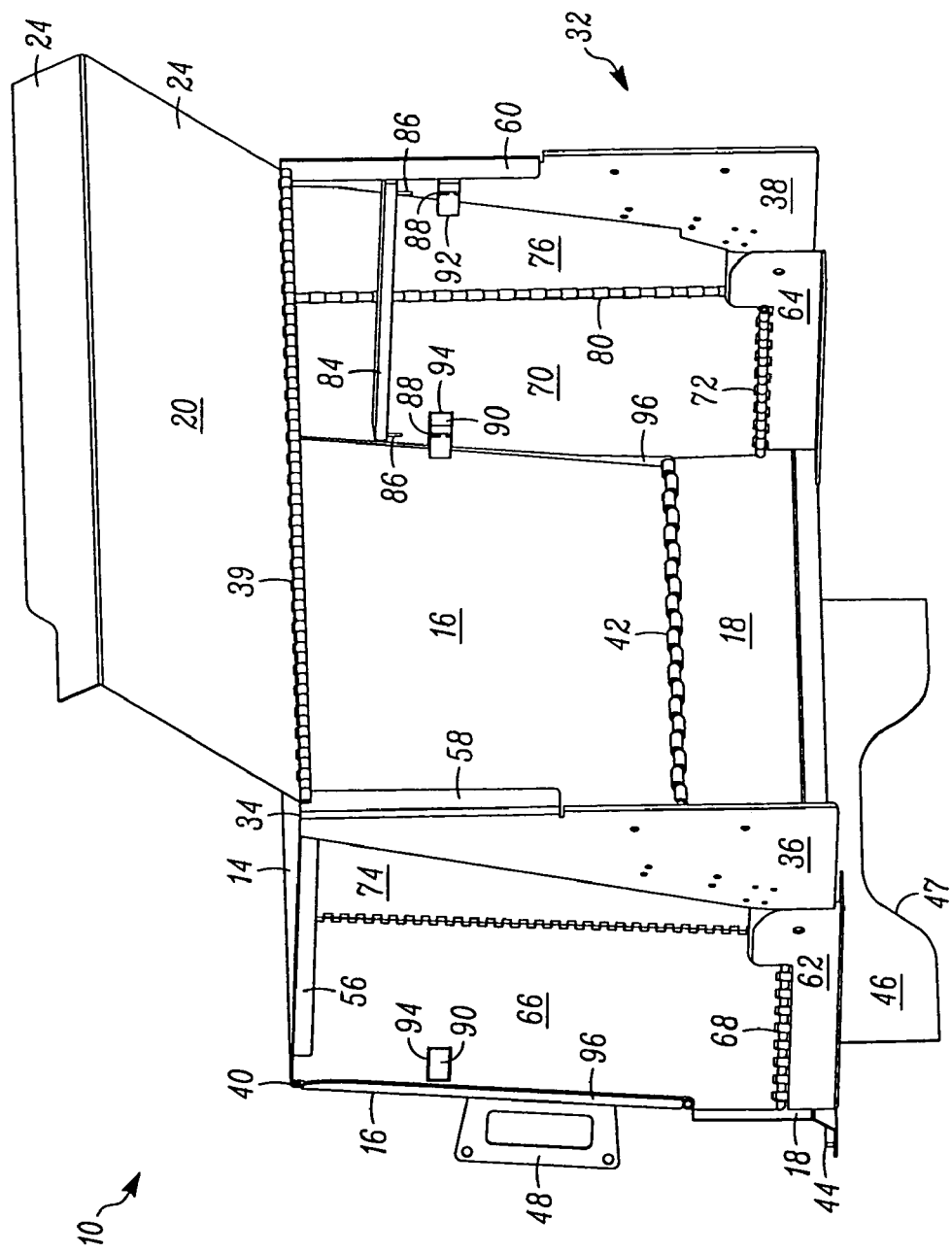
FIG. 13 is a rear perspective view of the seat shown in FIG. 12, showing the seat converted into the storage configuration.

Referring to FIGS. 12 and 13, the completion of the configuration change of seat 10 is shown. End plates 66 and 70 are raised from a generally horizontal position shown in FIG. 11, through the inclined position shown in FIG. 12 to the upright position shown in FIG. 13. End plates 66 and 70 can include one or more subplates, 74 and 76 respectively, which are connected to end plates 66 and 70 by hinges 78 and 80, respectively. Providing folding subplates 74 and 76 on end plates 66 and 70 prevents end plates 66 and 70 from protruding into small storage compartment 26, and also from interfering with seat belts (not shown) passing from the floor of vehicle 12 through apertures (not shown) in panels 14 and/or 16. Subplates 74 and 76 can be unfolded as end plates 66 and 70 are raised into their upright positions.

End plates 66, 70 and subplates 74, 76 can be locked into place with lock bars 84, one on each opposite end of the interior of seat apparatus 10. Lock bars 84 can be formed, for example, from 3/16 inch by 3/4% inch steel bar with 1/2 inch diameter lock pins 86 rigidly attached to each end. Lock pins 86 are received in receptacles 88 in lock bar anchors 90 and 92. Forward lock bar anchors 90 can pass through cutouts in seat bottom panel 16 and be welded to handles 48. Rear lock bar anchors 92 can be welded to the inside of uprights 36 and 38. Cutouts 94 can be provided in end plates 66 and 70 to allow end plates 66 and 70 to be pivoted up into an upright position without interference form lock bar anchors 90. With lock bars 84 in place as described, end plates 66, 70 and subplates 74, 76 are prevented from being pushed inward, thereby securing the ends of the storage enclosure. End plates 66 and 70 are prevented from being pulled outward by flanges 56 of seat back panel 14 and by flanges 96 of seat bottom panel 16. Similarly, subplates 74 and 76 are prevented from being pulled outward by flanges 56 of seat back panel 14 and by uprights 36 and 38.

Once seat 10 is reconfigured and lock bars 84 are in place as described above, rear panel 20 can be lowered to create a large storage compartment 82 bounded on the top by seat back panel 14, bounded in the front by seat bottom panel 16, bounded on the sides by end plates 66, 70 and subplates 74,76, bounded on the bottom by the floor of the vehicle 12 (not shown), and bounded in the rear by rear panel 20 and vehicle tailgate 28 (shown in FIG. 4). Rear panel 20 can be secured by common locking meanings and/or by locking tailgate 28 in its closed position.

In general, the reverse of the above steps are performed to return seat 10 from the storage configuration shown in FIG. 13 to the seating configuration shown in FIG. 5. Namely, rear panel 20 is raised and lock bars 84 are removed. Subplates 74 and 76 are folded in, and together with end plates 66 and 70 are lowered to a generally horizontal position, as shown in FIG. 11. Seat back panel 14 and seat bottom panel 16 are then lowered together to the seat configuration shown in FIG. 9. Preferably, locks 50 automatically engage strike plates 52 as seat back panel flanges 56 come into contact with seat stops 54. If not already lowered, real panel 20 can now be lowered to create small storage compartment 26, such as shown in FIG. 7.

When seat 10 is in the seating configuration, the seat area can be used as a tie down platform by using straps, bungee cords or the like connected to handles 48 on the sides of seat bottom panel 16. For instance, ice chests, portable camping supplies, camera gear and the like can be secured in this way, accessible from the front seats. A custom tube rack can also be provided to secure special containers to seat bottom panel 16, such as animal crates for dogs, cats or other pets. Preferably, any seat cushion provided is removed before installing the tube rack.

When seat 10 is in the storage enclosure configuration, seat bottom panel 16 is just behind the front seats, preferably tilted back slightly from vertical. A pouch, such as of vinyl, can be provided over seat bottom panel 16 to store quickly accessible items, such as maps, flashlights, snacks, a refuse container, cameras, binoculars and the like. The pouch can be attached to seat bottom panel 16 with Velcro® type hook and loop fastener material.

The storage compartments 26 and 82 may be made more secure by utilizing two steel hinge pins for each hinge, each on opposite ends of the hinge. These pins may be made from 1/4 inch diameter stainless steel rod. Moreover, one, two or more dimples can be placed at the end of each of the hinge pins, each dimple for engaging a lug on separate, preferably adjacent hinge element on a panel. It has been found that combining these design elements results in a hinge that is difficult to break apart.

End mounts 62 and 64, uprights 36 and 38 and top plate 34 may be integrally formed or attached together to form a single base unit, or may be separate pieces. Gussets may be used between members to create a more rigid structure. End mounts 62 and 64, uprights 36 and 38 and articulating member 18 may be screwed, bolted, welded, riveted, epoxied or otherwise permanently or releasably attached to the vehicle body 12. For example, as shown in FIG. 10, mounting holes 98 may be provided in uprights 36 and 38, and mounting holes 100 may be provided in end mounts 62 and 64 to bolt them to the vehicle body. The vehicle body may form the bottom of the storage enclosure, a base panel may be used, or a combination thereof. Similarly, side, end or other panels may be at least in part formed by the body or other components of the vehicle.

In alternative embodiments, end plates 66 and 70 may be stationary or movable. Each panel may be formed by a single piece, or formed by more than one panel. According to aspects of the invention, multiple panels may be coupled together, or may be independently moved into position. Panels may be slid, pivoted or pushed into place, snapped on, attached with Velcro® type hook and loop fastener material, or otherwise positioned as known by those skilled in the art.

According to various aspects of the present invention, the panels of seat 10 can be made from aluminum, steel, other metals, PVC, ABS, other polymers, fiberglass, wood or other materials, or a combination thereof. For example, uprights 36 and 38 can be formed from 3/16 inch thick aluminum plate, and rear panel 20, top plate 34, seat back panel 14, seat bottom panel 16, articulating member 18, anchor member 46, and end mounts 62, 64 can be formed from 0.100 inch thick aluminum plate. The panels need not be flat or have straight edges. A 3/8 inch thick, 1.25 inch wide aluminum support bar can be attached to the underside of top plate 34 for extra rigidity. The various hinges can be partially formed by the panels themselves as shown, or can be separate units attached to the panels. The pivoting of the panels can be accomplished by living hinges, flexures or other means known to those skilled in the art. Cushions, carpeting or other padding may be attached to or formed integrally with some or all of the various panels of seat 10, or omitted altogether. Edge guards 102 may be placed along panel edges to make them more comfortable to handle, keep them from rattling when vehicle 12 is driven, and to keep the panels from scratching each other during conversion between seating and storage configurations.

Seat 10 need not be forward facing as shown, but may be rearward facing, sideways facing or in another orientation. According to aspects of the present invention, seat 10 or variations thereof may be used in convertibles, trucks, sedans, vans, utility vehicles, recreational vehicles, boats, planes, trains, other moving vehicles, or independently.

While the above is a complete description of the preferred embodiments of the invention, various alternatives, modifications, and equivalents may be used. Therefore, the above description should not be taken as limiting the scope of the invention which is defined by the appended claims.

What is claimed is:

1. An apparatus comprising:
    a first portion;
    a second portion movably connected with the first portion;
    an articulation means for moving the first and second portions between a first position and a second position, wherein the first portion serves as a seat back and the second portion serves as a seat bottom when both are in the first position, and the first portion serves as a storage container top and the second portion serves as a storage container side when both are in the second position; and
    a third portion connected with the first portion, wherein the third portion serves as a storage container side, and wherein the third portion is movably connected with the first portion thereby serving as an access door into the storage container.

2. The apparatus of claim 1, further comprising a base means for movably supporting the first and second portions, wherein the base means forms a storage container bottom.

3. The apparatus of claim 2, wherein the base means is partially formed by a portion of a moving vehicle.

4. The apparatus of claim 3, wherein the moving vehicle is an automobile.

5. The apparatus of claim 1, further comprising at least one end portion movable between a first position and a second position, wherein the end portion serves as a storage container end when in the second position.

6. The apparatus of claim 1, wherein the articulation means includes a forth portion movably connected to the second portion, the forth portion moving away from the first portion whenever the first and second portions are moving between the first and second posditions.

7. A vehicle seat comprising:
    a base attachable to a vehicle;
    a seat back panel hingedly coupled to the base;
    a seat bottom panel hingedly coupled to the lower edge of the seat back panel,
    wherein the seat back panel is movable from a generally vertical position to a generally horizontal position, and the seat bottom panel is movable from a generally horizontal position to a generally vertical position to form at least part of a generally enclosed storage area on the vehicle; and
    a rear panel and a bottom panel to further form the generally enclosed storage area.

8. The vehicle seat of claim 7, wherein the seat back panel includes upper and lower edges, and wherein the upper edge is hingedly coupled to the base.

9. The vehicle seat of claim 7, wherein the seat bottom panel includes fore and aft edges, and wherein the aft edge is hingedly coupled to a lower edge of the seat back panel.

10. The vehicle seat of claim 7, wherein the rear panel is hingedly coupled to the base to provide openable and closable access to the storage area.

11. The vehicle seat of claim 7, wherein the bottom panel is at least partially formed by a portion of a vehicle body.

12. A vehicle seat comprising:
    a base attachable to a vehicle;
    a seat back panel hingedly coupled to the base;
    a seat bottom panel hingedly coupled to the lower edge of the seat back panel,
    wherein the seat back panel is movable from a generally vertical position to a generally horizontal position, and the seat bottom panel is movable from a generally horizontal position to a generally vertical position to form at least part of a generally enclosed storage area on the vehicle; and
    a plurality of movable side panels to further form the generally enclosed storage area.

13. The vehicle seat of claim 12, wherein the plurality of movable side panels are hingedly connected to the base.

14. The vehicle seat of claim 12, wherein the plurality of movable side panels include two side panels, each side panel being formed by a plurality of hingedly coupled sub-panels.

* * * * *